United States Patent [19]

Schwab et al.

[11] 3,972,963

[45] Aug. 3, 1976

[54] ORGANIC REINFORCING FILLERS FOR RUBBER

[75] Inventors: Frederick C. Schwab, Metuchen; James G. Murray, East Brunswick, both of N.J.

[73] Assignee: Mobil Oil Corporation, New York, N.Y.

[22] Filed: July 18, 1975

[21] Appl. No.: 597,851

Related U.S. Application Data

[63] Continuation of Ser. No. 371,645, June 20, 1973, abandoned.

[52] U.S. Cl. .......................... 260/880 B; 260/4 AR; 260/5; 260/876 B; 260/886; 526/85; 526/173; 526/336
[51] Int. Cl.² .......................................... C08L 9/06
[58] Field of Search........ 260/88.2 C, 876 B, 880 B, 260/886

[56] References Cited
UNITED STATES PATENTS

| | | | |
|---|---|---|---|
| 3,135,716 | 6/1964 | Uraneck | 260/880 B |
| 3,520,838 | 7/1970 | Burke | 260/886 |
| 3,734,978 | 5/1973 | Schwab | 260/878 B |

*Primary Examiner*—Paul R. Michl
*Attorney, Agent, or Firm*—Charles A. Huggett; Hastings S. Trigg

[57] ABSTRACT

Organic reinforcing fillers for rubber are prepared by the anionic initiated slurry polymerization of styrene and divinylbenzene in the presence of a block polymer dispersant. The polymerization reaction may be carried out using, as the anionic initiator, an alkali metal-bearing compound capable of initiating polymerization of styrene without imparting to the polymerization product groups reactive with rubber in a rubber cure in which case the polymerization is terminated by reaction of the polymer particles with a terminating agent that provides in the polymer groups reactive with rubber in a normal rubber cure; or the polymerization reaction can be carried out using, as the initiator, an alkali metal-bearing unsaturated polymer that in itself imparts to the polymer groups reactive with rubber in a normal rubber cure. In the latter case, the slurry polymerization may, if desired, be terminated by use of a terminating agent that reacts with and imparts to the polymer additional and different groups tha enhance reactivity of the polymer particles with rubber in a rubber cure operation.

15 Claims, No Drawings

ORGANIC REINFORCING FILLERS FOR RUBBER

CROSS-REFERENCE TO RELATED APPLICATIONS

This application is a continuation of copending application Ser. No 371,645, filed June 20, 1973, now abandoned.

BACKGROUND OF THE INVENTION

1. Field of the Invention

This invention is concerned with organic reinforcing fillers and their preparation.

2. Description of the Prior Art

Various materials have been proposed and used as reinforcing fillers for rubber. Carbon blacks are the major reinforcing fillers in use and treated fine particle silicas are also used for non-black applications. There have been proposed emulsion prepared polymers (not anionic) based on styrene-divinylbenzene with other monomers and graft polymers prepared by O. W. Burke, Jr. and others. A variety of copolymers and terpolymers were prepared by Burke et al. and this work has been summarized in "Reinforcement of Elastomers." Interscience, 1965, edited by G. Kraus, pages 511–527. These polymeric fillers were prepared by conventional emulsion polymerization using free radical initiators. To achieve the optimum reinforcing properties with fillers prepared in this manner it was necessary to polymerize the styrene divinylbenzene with additional monomers and to carry out additional grafting reactions on the formed particles. These polymerization methods require expensive monomers and lengthy polymerization times making the process uneconomic for the preparation of low cost fillers competitive with carbon black. Also to achieve optimum properties the secondary grafting reactions required further add to the cost of preparing filler materials. The best of these materials were deficient in properties in tire formulations, as compared with carbon blacks.

SUMMARY OF THE INVENTION

Organic reinforcing fillers for rubber are prepared by anionic initiated slurry polymerization of styrene and divinylbenzene in the presence of a block polymer dispersant that controls the particles of the resulting cross-linked polymer to a fine size, desirably less than 2000 A and under conditions of anionic initiator and/or reactant usage to impart into the polymer groups that are reactive with rubber in a normal rubber cure to provide effective bonding of the polymer particles to the rubber.

The block polymer dispersant useful for practice of this invention is comprised of polystyrene blocks and hydrocarbon-soluble blocks and non-reactive with the anionic initiator. Particularly suitable are AB and ABA block polymers in which segment A is derived from styrene in amount of about 5 to 80 weight percent, and preferably about 5 to about 50, based upon the total block polymer.

The slurry polymerization can be carried out by use, (1) as the anionic initiator, of an alkali metal compound that initiates polymerization of styrene and does not impart to the resulting polymer particles groups substantially reactive with rubber in a normal rubber cure, in which case the slurry polymerization is terminated by reaction of the polymer particles with a suitable terminating agent that imparts groups reactive with rubber in a rubber cure operation or the slurry polymerization can be carried out using (2) an anionic reactive initiator capable of polymerizing styrene while providing such rubber-reactive groups in the polymer particles. The slurry polymerization can also be carried out with (3) use of a combination of (1) and (2) as initiators in which case the slurry polymerization can be, as may be desired, terminated by reaction with materials that do or do not (e.g., methanol) impart to the polymer particles groups that are reactive with and further enhance bonding of the polymer particles (fillers) with rubber in a rubber cure operation.

DESCRIPTION OF SPECIFIC EMBODIMENTS

The organic reinforcing fillers embodied herein are prepared by slurry polymerization of styrene and divinylbenzene utilizing, as an anionic initiator, an alkali metal-bearing compound, capable of initiating the polymerization of styrene in the presence of an AB or ABA block polymer dispersant and, depending on the particular initiator employed, effecting the polymerization under conditions to impart to the resulting polymer particle groups that react with rubber in a normal rubber cure operation.

In the slurry polymerization process embodied herein, the divinylbenzene serves as a cross-linking agent and is generally used in an amount of between about 0.5 and 15.0 weight percent based on the styrene reactant.

The anionic initiators useful for the practice of this invention are basically of two types. One type is a non-polymeric alkali metal-bearing initiator typified by alkali metal alkyls including, in exemplification, butyllithium, sec-butyl lithium, amyl lithium, ethyl lithium, etc. as well as their corresponding sodium compounds; lithium or sodium salts of materials such as alpha methyl styrene, 1,1-diphenylethylene, naphthalene and others. Such materials, when used as the sole anionic initiators, result in a cross-linked "living" polymer from the slurry polymerization embodied herein whereby the slurry polymerization is terminated by further reaction with a suitable terminating agent to provide groups reactive with rubber in a rubber cure operation.

Another type of anionic initiator is an alkali metal-bearing unsaturated polymer having terminal alkali metal groups. Suitable materials of this type have a molecular weight of between about 1000 and about 100,000 and typical of which are alkali metal terminated polymers such as polyisoprenyl lithium, polybutadienyl lithium, poly(2,3-dimethyl butadienyl) lithium, and random copolymers of butadiene-styrene or isoprene-styrene having a terminal anionic lithium end group. By use of this type of initiator, which may be used in combination with an initiator of the type set forth in the preceding paragraph, the living polymer particles resulting from the slurry polymerization contain groups derived from the polymeric initiator that are reactive with rubber in a normal rubber cure operation. Hence, useful as such as fillers for rubber. If desired, such polymer particles may be further reacted by completion of the slurry polymerization with a terminating agent that imparts additional and different reactive groups in the polymer to enhance reactivity with rubber in a rubber cure operation.

The amount of anionic catalyst or initiator that is used is generally in the range of $10^{-1}$ to $10^{-4}$ moles per 100 grams of styrene reactant.

The slurrying medium for the polymerization reaction is an aliphatic hydrocarbon, liquid at the conditions of operation of the slurry polymerization, that is not reactive with the anionic initiator. The aliphatic hydrocarbon can be normal or branched chain, paraffinic or monoolefinic of at least three carbon atoms and, more desirably, of four to seven carbon atoms content. Typical slurrying media include butane, pentane, isopentane, hexane, heptane, 2,2-dimethylbutane, butene, pentene, as well as mixtures such as petroleum ether, pentane-pentene, hexane-hexene.

The polymerization process of the invention is carried out at temperatures between about 20°C. and about 120°C. The desired polymerization temperature is determined in part by the reflux temperature of the slurrying medium. It is however, within the contemplation of this invention to using pressure in order to elevate the reflux temperature of the slurrying medium.

The block polymer dispersing agent, generally used in an amount of about 0.1 to about 10 weight percent of the styrene reactant, used to prepare the fine particle filler materials is preferably an AB or ABA block polymer. In the block polymer, segment A is preferably derived from styrene in amounts from 5–80 weight percent styrene based on total block polymer. Segment B is based on monomers which polymerize to form a polymer readily soluble in aliphatic hydrocarbons and which does not readily react with the styryl anion. Suitable monomers for the formation of the B segment of the block polymer include an alkyl styrene such as t-butylstyrene, butadiene, isoprene, 2,2-dimethylbutadiene and the like and copolymers of the above dienes with styrene or alkyl styrenes.

The following Examples illustrate preparation of block polymers useful in practice of this invention.

EXAMPLE 1

In a reaction vessel equipped with a reflux condenser and agitation means were added 21 ml. of t-butylstyrene and 375 ml. of benzene. The solution was degassed by the application of a vacuum, followed by replacement with nitrogen. This step was repeated several times to insure proper degassing. A slight stream of nitrogen was continued throughout the ensueing polymerization reaction. A quantity of 1.9 ml. of 0.5 M sec-butyl lithium was added to initiate the reaction and the temperature was raised to 75°C. The polymerization was continued for 45 minutes. At this time 64 ml. of purified styrene monomer was added to the reactor and polymerization was allowed to proceed for an additional 30 minutes. The block polymer was separated from solution by precipitation in methanol. The reaction produced 74 grams of a block polymer containing 75 percent styrene by weight. Molecular weight data for this block polymer are set forth in Table I.

EXAMPLES 2 – 6

Using the procedure of Example 1, other t-butylstyrenestyrene block polymers were prepared and molecular weight data were obtained. Pertinent data are set forth in Table I.

TABLE I

| Example | % t-butylstyrene | % styrene | $M_s \times 10^{-3}$ (gms/mole) |
|---|---|---|---|
| 1 | 25 | 75 | 80 |
| 2 | 90 | 10 | 98 |
| 3 | 85 | 15 | 98 |
| 4 | 80 | 20 | 98 |
| 5 | 75 | 25 | 80 |
| 6 | 50 | 50 | 80 |

The following examples illustrate the preparation of dispersants other than of styrene and t-butyl-styrene:

EXAMPLE 7

An AB styrene-butadiene block copolymer was prepared by adding 0.9 ml. of 1.18 N sec-butyl lithium to a mixture of 20 g. of styrene in 350 ml. of benzene and 5 ml. of tetrahydrofuran under anhydrous air free conditions. After polymerization for 1 hour and 20 minutes at room temperature, 30 g. butadiene was distilled into the flask from over triethyl aluminum. After 2.5 hours additional reaction at room temperature, the reaction was terminated by addition of methanol and the product isolated by precipitation into a large volume of methanol. After filtration and drying there was isolated 48.7 g. of a polystyrene-butadiene block copolymer having blocks of polystyrene of 20,000 molecular weight and polybutadiene of 30,000 molecular weight.

EXAMPLE 8

An AB block polymer of styrene-isoprene was prepared by adding 0.42 ml. of 1.18 N sec-butyl lithium to a mixture of 10 g. of styrene of 175 ml. of benzene and 5 ml. of tetrahydrofuran at room temperature. The mixture was allowed to polymerize for 2 hours and 40 g. of dry air-free isoprene was added and the polymerization continued for 2 additional hours. The product was isolated by precipitation into methanol, yielding 27.5 g. of block polymer dispersant.

In regard to materials useful as terminating agents that impart groups in the polymer particles that are reactive with rubber in a rubber cure operation, such materials are compounds that react with the styryl anion on the filler particles to form functional groups attached to the particles and which in turn will react with a rubber molecule during conventional cure. Suitable terminating agents for that purpose include oxygen (air), carbon disulfide, carbonyl sulfide, sulfur, propylene sulfide, N-oxydiethylene-benzothia-zole-2-sulfenamide, benzothiazyl disulfide, dipentamethylene thiuram hexasulfide or unsaturated diolefins, such as butadiene or isoprene.

The following examples demonstrate the polymerization process of this invention and the effectiveness of the fillers so produced.

EXAMPLE 9

A mixture of 25.5 g. of styrene, 3.0 g. of p-divinylbenzene, and 1.5 g. of a block copolymer of styrene and p-t-butyl styrene (Example 4) containing 80 wt. % t-butyl styrene and nominally of 100,000 molecular weight were mixed in 500 ml. of hexane. After purging with nitrogen, polymerization was initiated with 11.6 ml. of 0.5 N secondary butyl lithium and the mixture heated at reflux under nitrogen for 30 minutes. The reaction was then terminated by addition of 1 ml. of carbon disulfide and the powdered product (averaging 600 to 1000A in particle size) isolated by addition of the mixture to methanol, filtration, and drying in vacuum.

To prepare a vulcanized rubber composition using this product as a reinforcing filler 12.8 g. of the powder was added to 45 g. of a commercial cold styrene-butadiene rubber (Shell 1500) (SBR) dissolved in hexane and the powder was well dispersed by passage through a colloid mill.

This product after precipitation into methanol and drying was milled in a Brabender Plasticorder with 0.5 g. sulfur, 0.30 g. stearic acid, 0.89 g. zinc oxide, and 0.30 g. of MBTS (2,2'-benzothiazyl disulfide) at 50°C. The resulting composition after standing overnight was milled at 122°F. and cured in a press at 293°F. for 35 minutes. The tensile properties of this cured rubber as compared to a control sample containing no filler are illustrated in the following Table II.

Table II

|  | Tensile psi Break | % Elongation | 300% Modulus | Set at Break | Shore A Hardness | Swell qm' |
|---|---|---|---|---|---|---|
| Control SBR Gum Stock Sample | 410 | 507 | 240 | 10 | 53 | 6.74 |
| Example 9 | 3100 | 973 | 490 | 50 | 67 | 5.90 |

EXAMPLES 10 – 18

A t-butylstyrene-styrene block polymer dispersant was prepared as in Example 4. Also, a solution of polyisoprene having a molecular weight of 10,000 and a terminal anionic lithium end group was prepared by reacting 15 ml. of isoprene in 45 ml. of hexane with 2.0 ml. of 0.51 N s-butyl lithium solution at room temperature under anhydrous, air free conditions.

Polymerization in each run, was carried out by adding 31.4 ml. of styrene and 3.26 ml. of 55% divinylbenzene to a mixture of 1.5 g. of the t-butylstyrene-styrene block copolymer, 4.4 ml. of the polyisoprenyl lithium solution and 11.6 ml. of 0.51 N s-butyllithium solution in 500 ml. of hexane under anhydrous, air free conditions at room temperature. The temperature was raised to 60°C. during 20 minutes and held at that temperature with stirring for an additional 40 minutes. The filler particles having active lithium groups were then terminated with a variety of functional reagents to produce different reactive groups at the end of the polystyrene chains and the resulting emulsions (containing polymer particles averaging about 300A) were mixed with styrene-butadiene rubber (SBR used in Example 9) solution in hexane and the mixture precipitated into methanol and dried.

The resulting mixtures were made up to contain 28 parts of the organic filler in 100 parts rubber assuming complete conversion in the polymerization reaction. This series of rubber samples was cured by mixing in the Brabender Plasticorder with the following parts per 100 parts rubber of cure ingredients — 2 parts sulfur, 1.5 parts stearic acid, 3 parts zinc oxide and 1.75 parts benzothiazyl disulfide (MBTS) and curing the resulting mixture at 145°C. for 35 minutes. The properties of the cured rubber obtained in these examples are given in Table III.

EXAMPLE 19

To a mixture of 3 g. of the dispersant prepared in Example 7 above, 3 g. of paraffin wax 60 g. of styrene, 3 g. of 55% divinyl benzene mixed isomers, and 3 g. of polyisoprenyllithium of 10,000 molecular weight, in 500 ml. of dry air free hexane was added 6.37 ml. of 1.18 N sec-butyl lithium. The reaction was started at 28°C and allowed to warm to 43°C during 1.5 hours. The reaction was then terminated by bubbling carbonyl sulfide into the mixture until the orange color of the active styryl lithium anion had disappeared. Solvent was then removed by evaporation of excess hexane yielding 67 g. of solid filler. A sample of 9 g. of this filler was compounded with 29.7 g. of the SBR rubber and 0.6 g. sulfur, 0.45 g. stearic acid, 0.89 g. zinc oxide and 0.52 g. MBTS and cured at 293°F for 35 minutes. The cured rubber sample prepared in this way had the properties set forth in Table III.

EXAMPLE 20

To a mixture of 3 g. of the dispersant prepared in Example 8 above, 3 g. of paraffin wax, 3 g. of 55% divinylbenzene mixed isomers, 60 g. of styrene, and 3 g. of 10,000 molecular weight polyisoprenyl lithium in 500 ml. of hexane was added 6.37 ml. of 1.18 N sec-butyl lithium at room temperature. The temperature rose to 51°C. and the mixture was allowed to react for 1.5 hours. The reaction mixture was cooled to room temperature and terminated by passing dry air into the mixture. Solvent was evaporated from the mixture and the dried powder compounded into rubber as in Example 19. The properties of the rubber prepared from this sample were as set forth in Table III.

TABLE III

PROPERTIES OF CURED RUBBER SAMPLES CONTAINING ORGANIC FILLERS HAVING DIFFERENT TERMINATING GROUPS

| Example | Terminating Reagent | Terminal Group | Tensile Break psi | Modulus 300% | Elong. % | Set At Break % | Hardness Shore A | Abrasion Resist Taber % Loss |
|---|---|---|---|---|---|---|---|---|
|  | Gum Stock (Control) | — | 410 | 240 | 507 | 10 | 53 | 4.09 |
| 10 | CH$_3$OH | —H | 2240 | 440 | 870 | 50 | 70 | 3.57 |
| 11 | O$_2$,CH$_3$COOH | —OOH | 2830 | 480 | 970 | 50 | 70 | 2.72 |
| 12 | CS$_2$ | —C(S)SLi | 3440 | 590 | 804 | 50 | 68 | — |
| 13 | S$_x$ | —S$_x$—Li | 2440 | 670 | 680 | 35 | 71 | 1.76 |

TABLE III-continued
PROPERTIES OF CURED RUBBER SAMPLES CONTAINING ORGANIC FILLERS HAVING DIFFERENT TERMINATING GROUPS

| Example | Terminating Reagent | Terminal Group | Break psi | Tensile Modulus 300% | Elong. % | Set At Break % | Hardness Shore A | Abrasion Resist Taber % Loss |
|---|---|---|---|---|---|---|---|---|
| 14 | tolylene diisocyanate | 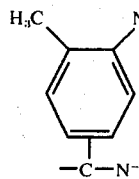 | 3060 | 720 | 743 | 39 | 71 | 3.43 |
| 15 | Propylyene Sulfide | 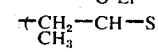 | 2760 | 520 | 987 | 53 | 68 | 2.73 |
| 16 | N-Oxydiethylene benzothiazole-2-sulfenamide | — | 3200 | 620 | 30 | 43 | 68 | 2.52 |
| 17 | Benzothiazyl Disulfide | — | 2010 | 740 | 650 | 33 | 72 | 3.37 |
| 18 | Dipentamethylene Thiuram Hexasulfide | — | 2140 | 1680 | 354 | 23 | 75 | 2.93 |
| 19 | COS | — | 2490 | 470 | 900 | 61 | 63 | 5.94 |
| 20 | Air | — | 3320 | 460 | 975 | 55 | 62 | 5.83 |

From the foregoing data, it will be appreciated that the organic reinforcing fillers of this invention are highly effective when blended with a rubber base stock and the usual rubber curing components and then cured. The terminal reactive groups help to promote the rubber cure and bond to the rubber molecule during the cure reaction.

The compositions of this invention include mixtures of the reinforcing fillers with a curable rubber, such as styrene-butadiene rubber (SBR), ethylene-propylene-diene terpolymer rubber (EPDM), ethylene-propylene rubber (EPR), polyisoprene, polybutadiene, and natural rubber. The amount of reinforcing filler used will generally be about 10 to about 100 parts (by weight) per 100 parts (by weight) of rubber, i.e., PHR. The vulcanizable rubber formulation can contain other rubber cure ingredients. A discussion of typical ingredients and cure recipes which can be used for compounding the materials of this invention can be found in the Vanderbilt Rubber Handbook (The Vanderbilt Rubber Handbook, Edited by George G. Winspear, R. T. Vanderbilt Co. Inc., Publisher, 230 Park Ave., New York, N.Y. 10017, 1968).

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for producing an organic reinforcing filler for rubber that consists essentially of slurry polymerizing a reaction mixture comprising styrene, divinylbenzene, and an anionic polymerization initiator dispersed in a liquid aliphatic hydrocarbon slurrying medium in presence of from about 0.1 to about 10 weight percent based upon the styrene reactant of an AB block polymer dispersant of styrene and t-butylstyrene styrene and butadiene, or styrene and isoprene to produce a finely divided solid cross-linked polymer, said anionic polymerization initiator comprising (1) butyllithium, sec-butyllithium, amyllithium, ethyllithium, butylsodium, sec-butylsodium, amylsodium or ethylsodium (2) an alkali metal-bearing unsaturated hydrocarbon polymer that initiates polymerization of styrene while providing in the resulting finely-divided polymer groups reactive with rubber in rubber cure, or (3) a mixture of (1) and (2) said process being further characterized in that when carried out with an initiator defined in (1) the slurry polymerization is terminated with carbonyl sulfide, propylene sulfide, N-oxydiethylene-benzothiazole-2-sulfenamide, benzothiazyl disulfide, or dipentamethylene thiuram hexasulfide to impart thereto groups reactive with rubber in a rubber cure operation and, when said process is carried out with an initiator as defined in (2) or (3), the slurry polymerization is optionally terminated with carbonyl sulfide, propylene sulfide, N-oxydiethylene-benzothiazole-2-sulfenamide, benzothiazyl disulfide, or dipentamethylene thiuram hexasulfide to impart thereto additional groups reactive with rubber in a rubber cure operation.

2. A process for producing an organic reinforcing filler for rubber that consists essentially of slurry polymerizing a reaction mixture comprising styrene, divinylbenzene, and an anionic polymerization initiator dispersed in a liquid aliphatic hydrocarbon slurrying medium in presence of from about 0.1 to about 10 weight percent based upon the styrene reactant of an AB block polymer dispersant of styrene and t-butylstyrene, styrene and butadiene, or styrene and isoprene to produce a finely divided solid cross-linked polymer, said anionic polymerization initiator comprising butyllithium, sec-butyllithium, amyllithium, ethyllithium, butylsodium, sec-butylsodium, amylsodium or ethylsodium, said process being further characterized in that the slurry polymerization is terminated with carbon disulfide, carbonyl sulfide, propylene sulfide, N-oxydiethylene-benzothiazole-2-sulfenamide, benzothiazyl disulfide, or dipentamethylene thiuram hexasulfide.

3. A process, as defined in claim 1, in which the reaction mixture comprises from about 0.5 to 15.0 weight percent of divinylbenzene based on the styrene reactant, about $10^{-1}$ to $10^{-4}$ moles of the anionic initiator per 100 grams of the styrene reactant, and the slurry polymerization is carried out at about 20° to about 120°C.

4. A process, as defined in claim 1, carried out with an initiator as defined in (2) or (3) that comprises an alkali-metal terminal unsaturated hydrocarbon polymer having a molecular weight of about 1000 to 100,000.

5. A process, as defined in claim 4, wherein the alkali metal of said unsaturated polymer is lithium.

6. A process, as defined in claim 4 wherein the alkali metal terminal polymer is polyisoprenyllithium or polybutadienelithium.

7. A process, as defined in claim 4, in which the reaction mixture comprises from about 0.5 to about 15.0 weight percent of divinylbenzene based on the styrene reactant, about $10^{-1}$ to $10^{-4}$ moles of the anionic initiator per 100 grams of the styrene reactant, and the slurry polymerization is carried out at about 20° to about 120°C.

8. The reinforcing filler produced by the process of claim 1.

9. The reinforcing filler produced by the process of claim 2.

10. The reinforcing filler produced by the process of claim 3.

11. The reinforcing filler produced by the process of claim 6.

12. A curable rubber containing the reinforcing filler defined in claim 8.

13. A curable rubber containing the reinforcing filler of claim 9.

14. A curable rubber containing the reinforcing filler of claim 10.

15. A curable rubber containing the reinforcing filler of claim 11.

* * * * *